(12) United States Patent
Lai et al.

(10) Patent No.: US 6,742,444 B1
(45) Date of Patent: Jun. 1, 2004

(54) ELECTRIC COOKING APPARATUS

(75) Inventors: Wai Hing Lai, Kowloon (HK); Leung Chi Ho, New Territories (HK)

(73) Assignee: Eastern Sources Housewares (Hong Kong) Limited, Kowloon (HK)

( * ) Notice: Subject to any disclaimer, the term of this patent is extended or adjusted under 35 U.S.C. 154(b) by 0 days.

(21) Appl. No.: 10/643,949

(22) Filed: Aug. 20, 2003

(51) Int. Cl.$^7$ .............................. A47J 37/12; A23L 1/00
(52) U.S. Cl. .............................. 99/330; 99/331; 99/337; 99/403; 219/430; 219/432
(58) Field of Search ................... 99/337, 338, 326–335, 99/339–342, 403–417, 444–450, 470, 472, 486, 489; 126/391.1, 377.1; 219/430–432, 435, 436, 429, 440, 441, 492–494, 385, 386; 210/167, DIG. 8; 220/912, 316; 426/438, 523

(56) References Cited

U.S. PATENT DOCUMENTS

| | | | | |
|---|---|---|---|---|
| 4,995,312 A | * | 2/1991 | Leiros | 99/411 |
| 5,029,519 A | * | 7/1991 | Boyen | 99/341 |
| 5,092,229 A | * | 3/1992 | Chen | 99/337 |
| 5,355,777 A | * | 10/1994 | Chen et al. | 99/340 |
| 5,400,700 A | * | 3/1995 | Bois | 99/403 |
| 5,429,039 A | * | 7/1995 | Chang | 99/331 |
| 5,701,805 A | * | 12/1997 | Sa | 99/331 |
| 5,768,976 A | * | 6/1998 | Suk | 99/337 |
| 5,839,357 A | * | 11/1998 | Ha et al. | 99/337 |
| 5,996,474 A | * | 12/1999 | Collas et al. | 99/337 |
| 6,047,632 A | * | 4/2000 | Bouffay et al. | 99/403 |
| 6,125,737 A | * | 10/2000 | Chang | 99/331 |
| 6,283,014 B1 | * | 9/2001 | Ng et al. | 99/330 |

* cited by examiner

Primary Examiner—Timothy F. Simone
(74) Attorney, Agent, or Firm—Burns, Doane, Swecker & Mathis, L.L.P.

(57) ABSTRACT

An electric cooking apparatus, e.g. a deep fryer, is disclosed as including a body, a tank for containing food to be cooked and a control module for controlling the operation of the deep fryer, in which the body, the tank and the control module are releasably engageable with one another, and the tank and control module each includes a respective engagement member which are complementary with and releasably engageable with each other, and the control module is locked against movement from the body when the body, the tank and the control module are engaged with one another. The tank has a bottom surface for supporting the food to be cooked, and when the apparatus is positioned on a horizontal surface, the bottom surface of the tank is inclined relative to the horizontal surface.

13 Claims, 11 Drawing Sheets

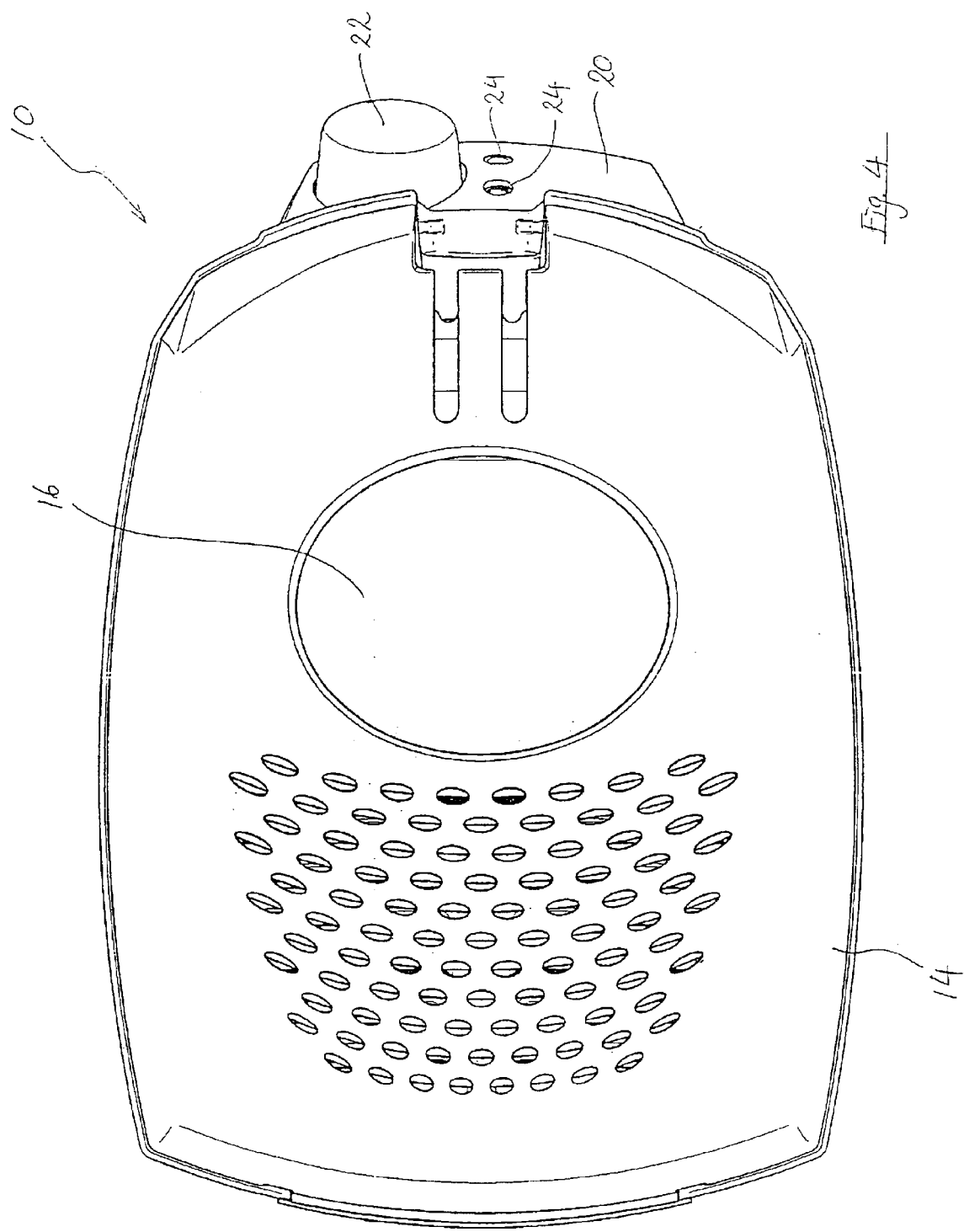

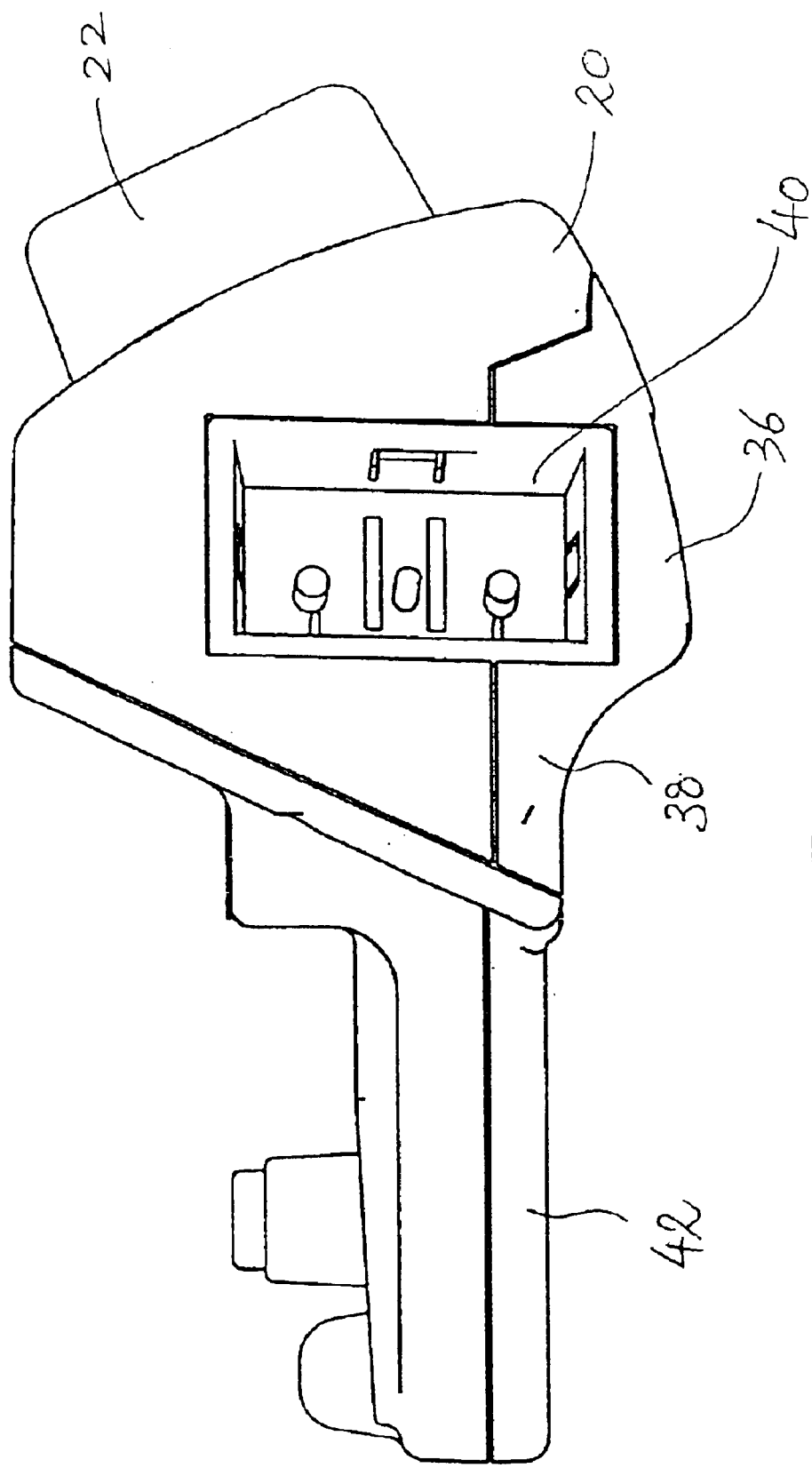

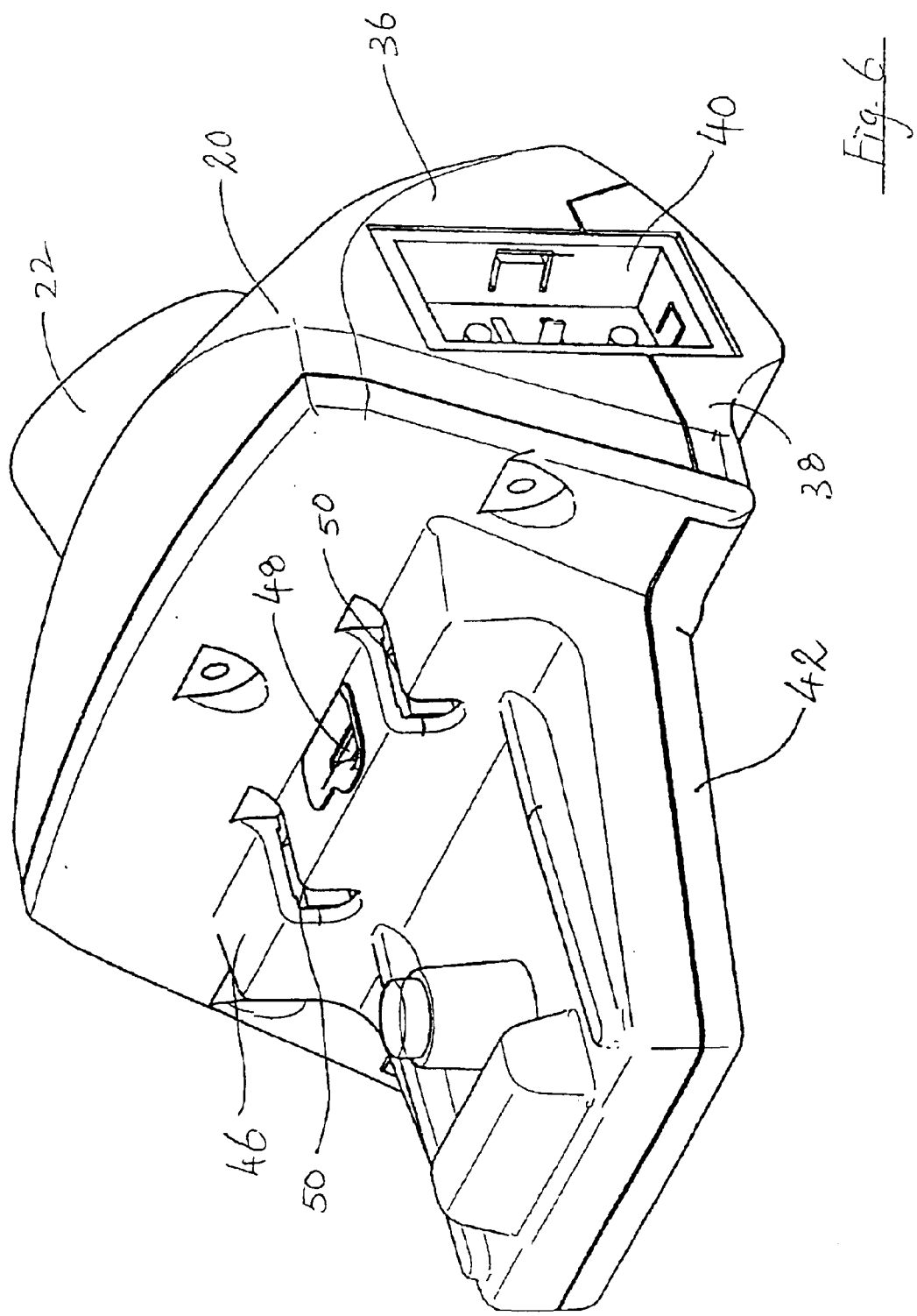

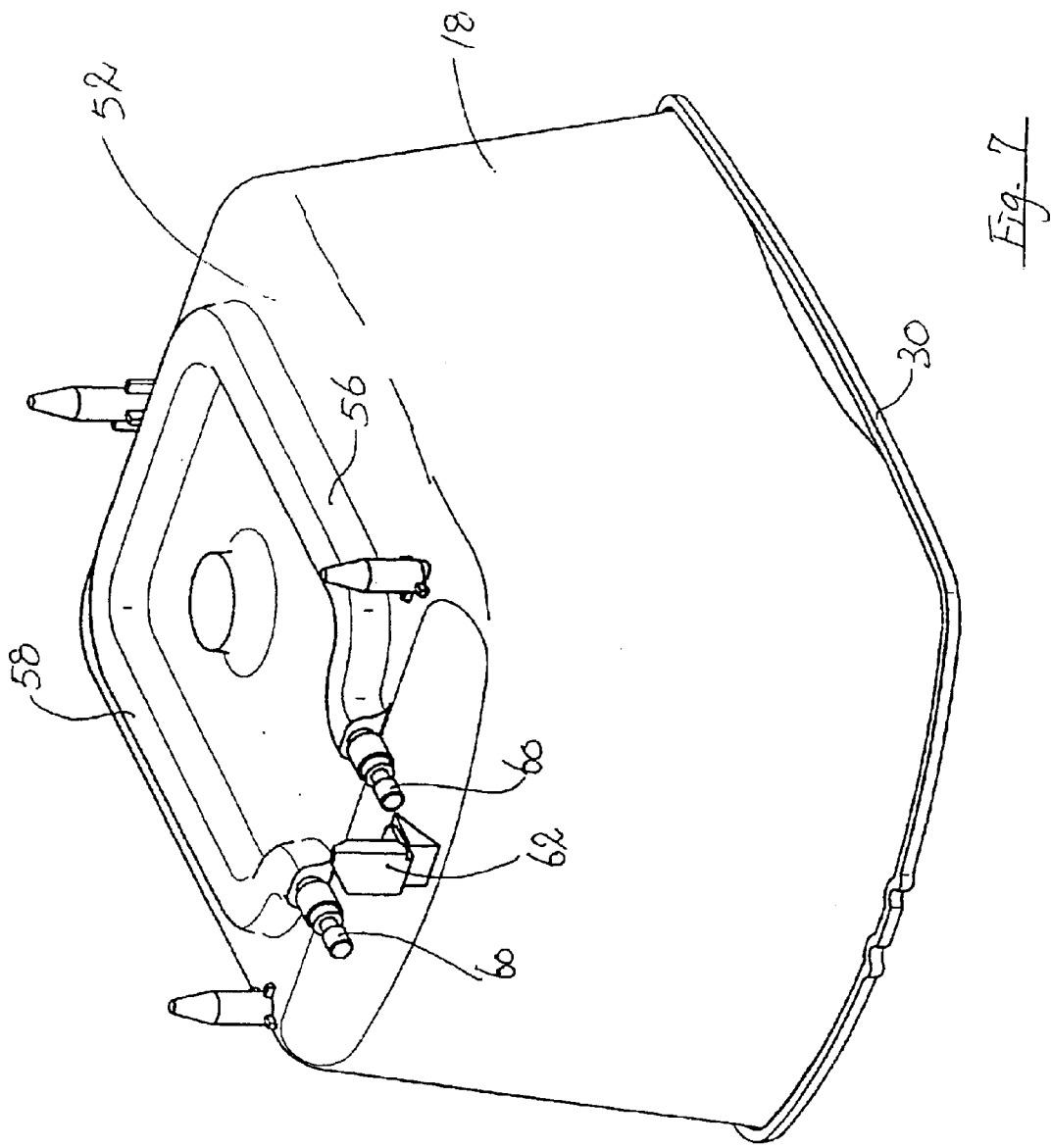

ELECTRIC COOKING APPARATUS

This invention relates to an electric cooking apparatus, and in particular such an electric cooking apparatus including removable control module and food container.

BACKGROUND OF THE INVENTION

There are in existence a large variety of electric cooking apparatus, including, e.g. deep fryers and grills. In some such apparatus, there have been provided with a detachable control module with various electrical and/or electronic components for controlling the operation of the apparatus. However, the connection between the control module and the rest of the apparatus is often rather loose such that accidental disconnection would sometimes occur.

Furthermore, it has always been very difficult to clean the apparatus since such contains a large number of water-sensitive electrical and/or electronic components. In addition, sometimes a user may have poured too little oil into the deep fryer. This is very dangerous as over-heating may occur.

It is thus an object of the present invention to provide an electric cooking apparatus in which the aforesaid shortcomings are mitigated, or at least to provide a useful alternative to the public. Such and other objects of the present invention will become apparent from the ensuing discussion.

SUMMARY OF THE INVENTION

According to a first aspect of the present invention, there is provided an electric cooking apparatus including a body member, a container adapted to contain food to be cooked and a control module operable to control the operation of said apparatus, wherein said body member, said container and said control module are releasably engageable with one another, wherein said container and said control module each includes a respective engagement member which are complementary with and releasably engageable with each other, and wherein said control module is locked against movement from said body member when said body member, said container and said control module are engaged with one another.

Said control module may conveniently be disengageable from said body member only when said engagement members are disengaged from each other. This would prevent unintentional disengagement of the control module from the apparatus.

Said body member may suitably be free of electrical or electronic components, thus allowing the body member to be cleaned in water or other cleaning liquid.

The container may advantageously be mounted with at least one heating element, for heating up the container and the food and/or cooking medium therein.

The control module may advantageously include at least one electrical connector adapted to electrically connect with at least one complementary electrical connector of said container to close an electric circuit of said apparatus. Conveniently, said control module may include a pair of electrical connectors adapted to electrically connect with a pair of complementary electrical connectors of said container to close an electric circuit of said apparatus. Such seeks to ensure that the apparatus is only operable when such is properly assembled.

Said at least one electrical connector of said container may suitably be carried by a heating element of said container. More conveniently, said at least one electrical connector of said container may be provided at an end of said heating element. Advantageously, said pair of electrical connectors of said container may be carried by a heating element of said container. More suitably, said pair of electrical connectors of said container may each be provided at a respective end of said heating element.

According to a second aspect of the present invention, there is provided an electric cooking apparatus including a body member, a container adapted to contain food to be cooked and a control module operable to control the operation of said apparatus, wherein said body member, said container and said control module are releasably engageable with one another, wherein said container has a bottom surface for supporting said food to be cooked, and wherein when said apparatus is positioned on a horizontal surface, said bottom surface of said container is inclined relative to said horizontal surface.

Said container may suitably include an upper rim and said bottom surface of said container may be inclined relative to a plane containing said upper rim of said container. Advantageously, when said body member, said container and said control module are engaged with one another, said bottom surface of said container may slope upwardly from an end proximate said control module to an opposite end thereof.

BRIEF DESCRIPTION OF THE DRAWINGS

A preferred embodiment of the present invention will now be described, by way of example only, with reference to the accompanying drawings, in which:

FIG. 4 is a top view of the deep fryer shown in FIG. 1;

FIG. 5 is a side view of the control module of the deep fryer shown in FIG. 1;

FIG. 6 is a perspective view of the control module shown in FIG. 5;

FIG. 7 is a perspective view of the bottom part of the tank of the deep fryer shown in FIG. 1;

DETAILED DESCRIPTION OF THE PREFERRED EMBODIMENT

Figure 1:
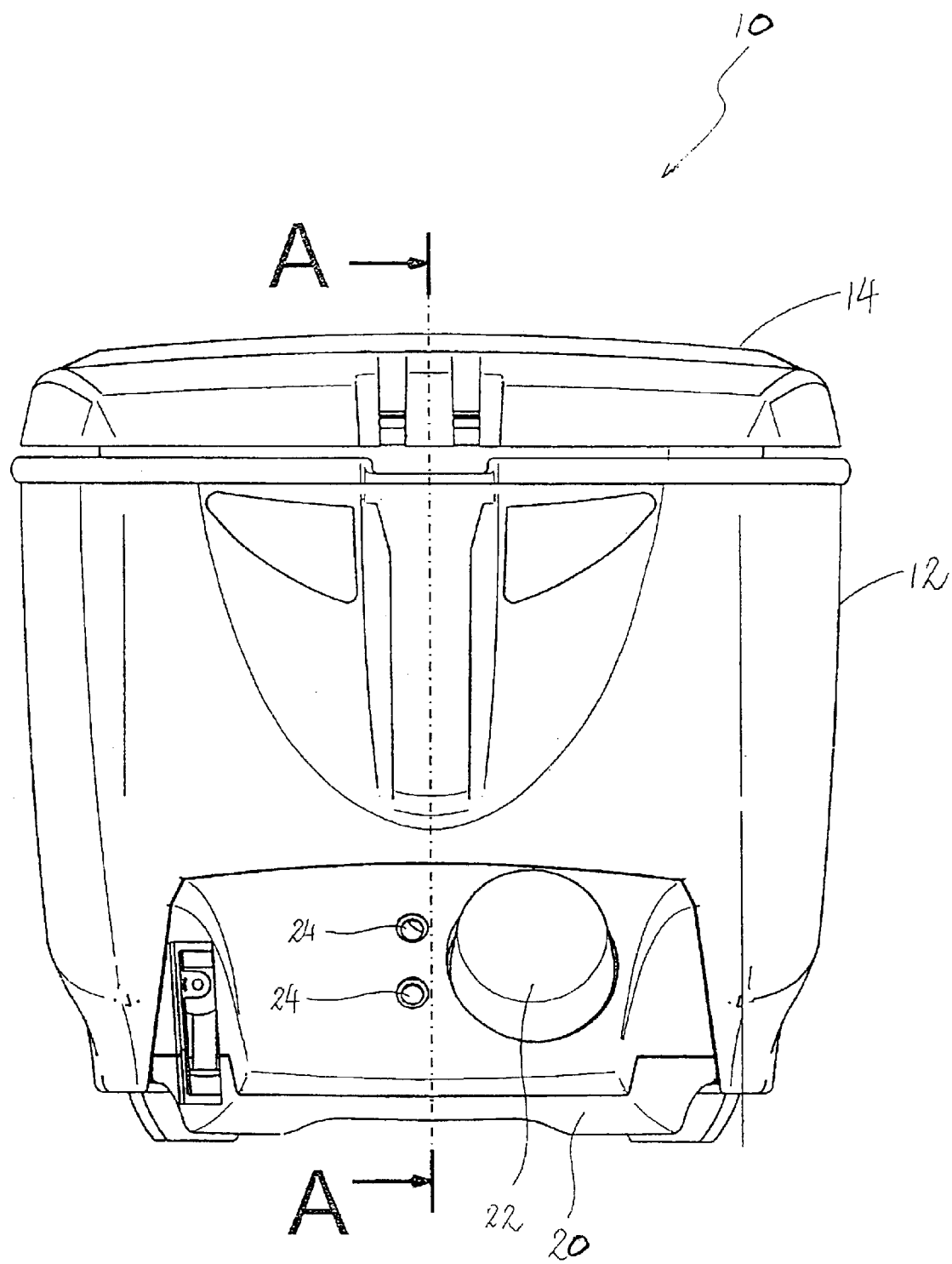
FIG. 1 is a front view of a deep fryer according to a preferred embodiment of the present invention.

FIGS. 1 to 4 show various views of an electric deep fryer according to a preferred embodiment of the present invention, and generally designated as 10. It should be understood that although the present invention is now discussed using an electric deep fryer as an example, the present invention may be implemented in various other electrical cooking apparatus, e.g. electric rice cookers, electric grills, electric steamers, etc.

The deep fryer 10 includes a body 12 hingedly connected with a cover 14, so that the cover 14 may be swivellable relative to the body 12 for selectively covering the body 12. As can be seen in FIG. 4, the cover 14 has a transparent window 16 allowing the interior of the body 12 to be viewed from the outside.

Detachably housed within a cavity of the body 12 is a tank 18 for containing the food or beverage, e.g. soup, to be cooked. Also releasably engaged with the body 12 is a control module 20. The control module 20 includes a number of electrical and/or electronic components (not shown), and a knob 22 and indication lights 24 for controlling and monitoring the operation of the deep fryer 10.

Figure 2:
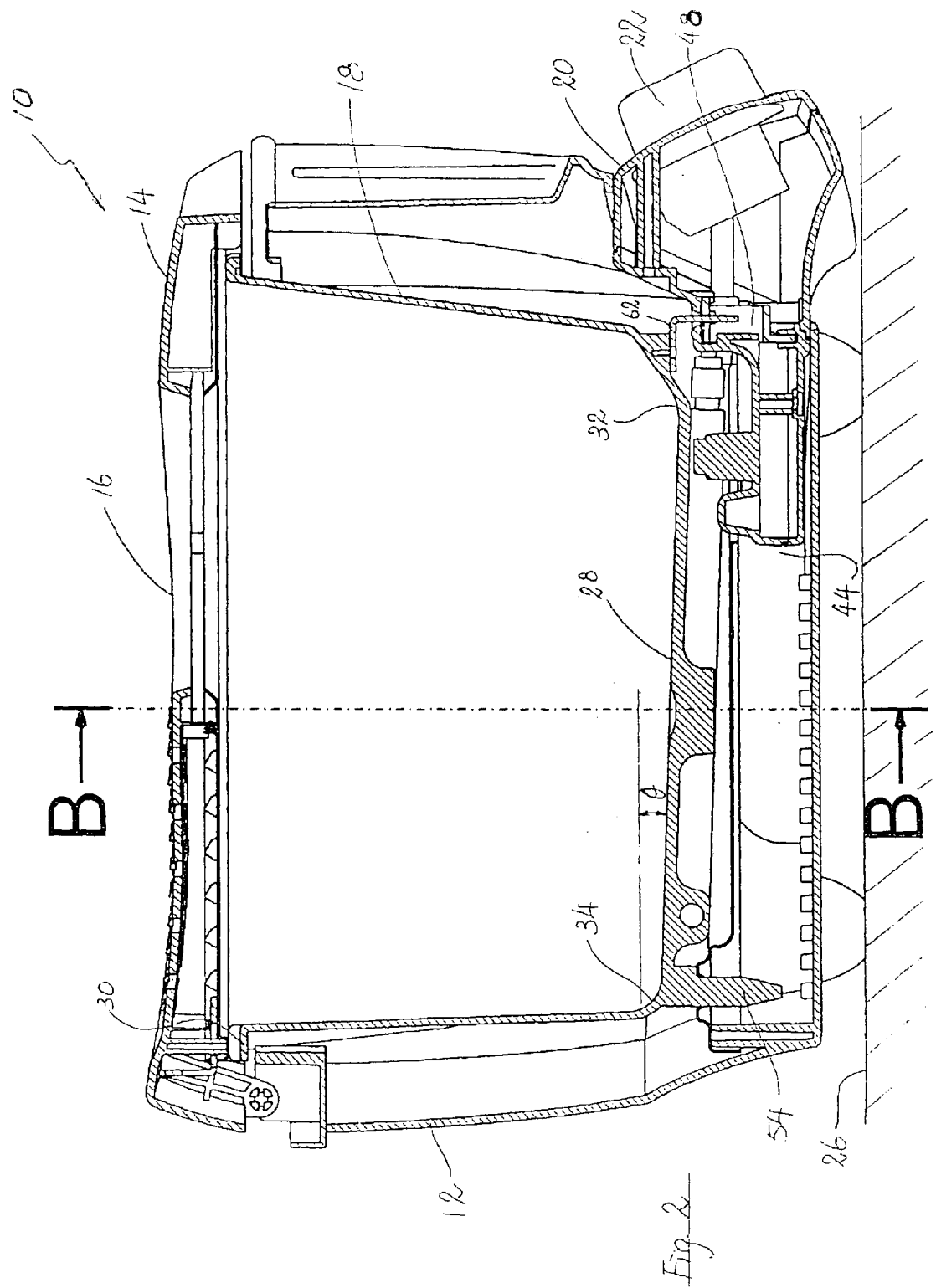
FIG. 2 is a sectional view of the deep fryer taken along the line A—A in FIG. 1.
Figure 3:
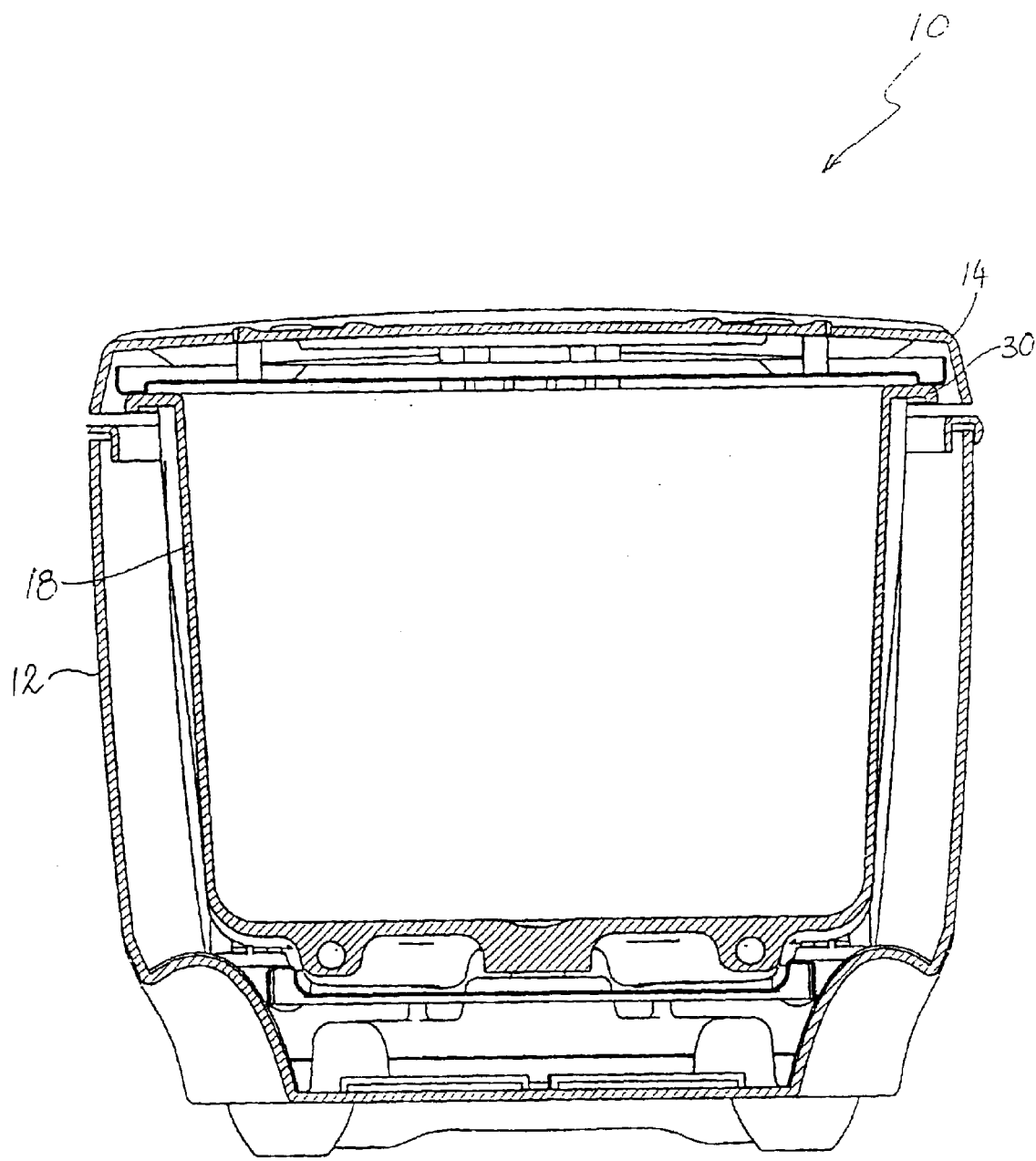
FIG. 3 is a sectional view of the deep fryer taken along the line B—B in FIG. 2.

Referring in particular to FIG. 2, such shows the deep fryer 10 supported on a horizontal surface 26. It can be seen that a bottom surface 28 of the tank 18, on which food may be supported for cooking, is inclined relative to the horizontal by an acute angle θ. As a plane containing an upper rim 30 of the tank 18 is parallel to the horizontal, the bottom surface 28 is also inclined relative to the plane containing the upper rim 30 by the same acute angle θ. It can also be seen that the bottom surface 28 of the tank 18 slopes upwardly from an end 32 proximate the control module 20 to an opposite end 34. By way of such an arrangement, even if too little cooking medium, e.g. oil, is poured into the tank 18, the oil will gather near the end 32 of the tank 18, thus reducing the risk of over-heating or over-shooting.

Turning now to FIGS. 5 and 6, such show respectively a side view and a perspective view of the control module 20 of the deep fryer 10. The control module 20 has a body portion 36 for housing various electrical and/or electronic components (now shown). As can be seen, on a side 38 of the control module 20 is a socket 40 for releasable engagement with a plug of an electric cord (not shown), for electrically connecting the control module 20, and thus the deep fryer 10, with an electricity source. The socket 40 may in particular be configured to be suitable for use with a detachable cord made in accordance with U.S. Pat. No. 6,586,942, to further enhance safety in use of the deep fryer 10.

The control module 20 also has a foot portion 42 for insertion into a lower cavity 44 (see FIG. 2) from a front end of the body 12 of the deep fryer 10. As can be seen more clearly in FIG. 6, provided through a step portion 46 is a vertical hole 48, for releasable inter-engagement with the tank 18, in a manner to be discussed below. On each respective side of the hole 46 is a top open channel 50, each leading to a respective electric connection surface (not shown) of the control module 20, the purpose of which would be discussed below.

Referring now to FIG. 7, extending from a bottom side 52 of the tank 18 are three spikes 54, each adapted to be received within a respective hole on an inner bottom surface of the body 12, for properly aligning the tank 18 with the body 12. Fixedly secured to and lying along the bottom side 52 of the tank 18 is a heating coil 56, sealed up by a protective cover 58, with its two ends 60 exposed to the outside environment. The heating coil 56 may be caused to heat up, upon passing of an electric current, to thereby heat up the content in the tank 18. There is also provided a ledge 62 extending vertically away from the bottom side 52 of the tank 18.

Turning now back to FIG. 2, it can be seen that, when the deep fryer 10 is properly assembled, i.e. when the body 12, the tank 18, and the control module 20 are properly inter-engaged with one another, the ledge 62 of the tank 18 is received within the vertical hole 48 of the control module 20, and the two ends 60 of the heating coil 56 of the tank 18 are received in the channels 50 of the control module 20 to establish electrical contact with the electric connection surfaces of the control module 20.

It can thus be seen that, by way of such an arrangement:

a. once the deep fryer 10 is properly assembled, the control module 20 is locked against movement from the body 12. In particular, the control module 20 may only be disengaged from the body 12 when the ledge 62 of the tank 18 is disengaged from the vertical hole 48 of the control module 20;

b. the electric circuit of the deep fryer 10 is closed, and thus operable, only when the deep fryer 10 is properly assembled. Such will significantly reduce the danger of inappropriate operation of the deep fryer 10; and c. the body 12 is free of all electrical or electronic components. Such will allow the body 12 to be cleansed thoroughly by water or other cleaning liquid. Of course, the tank 18 may also be cleansed in the conventional manner.

Figure 8A:
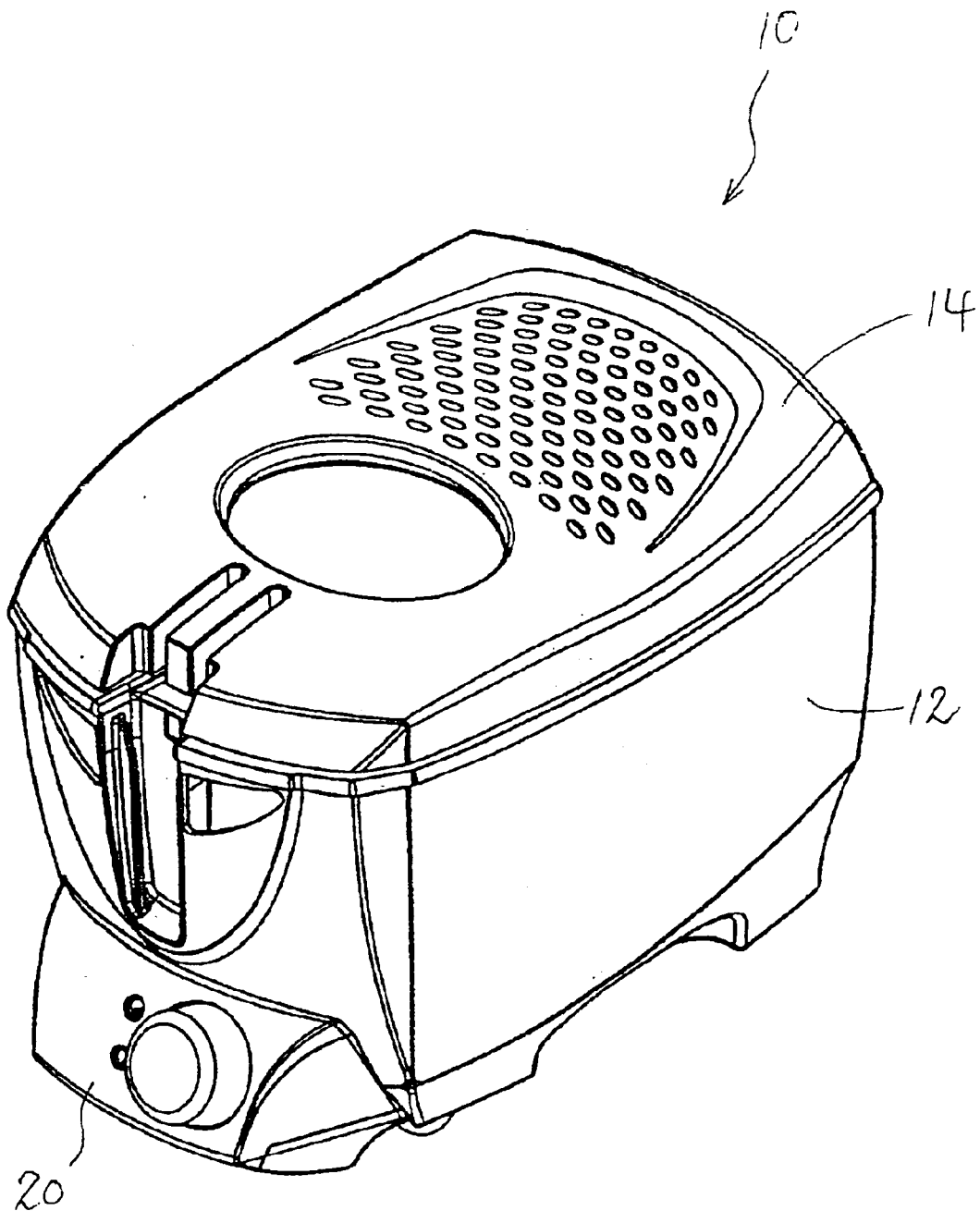
FIG. 8A is a perspective view of the deep fryer shown in FIG. 1, in a closed configuration.
Figure 8B:
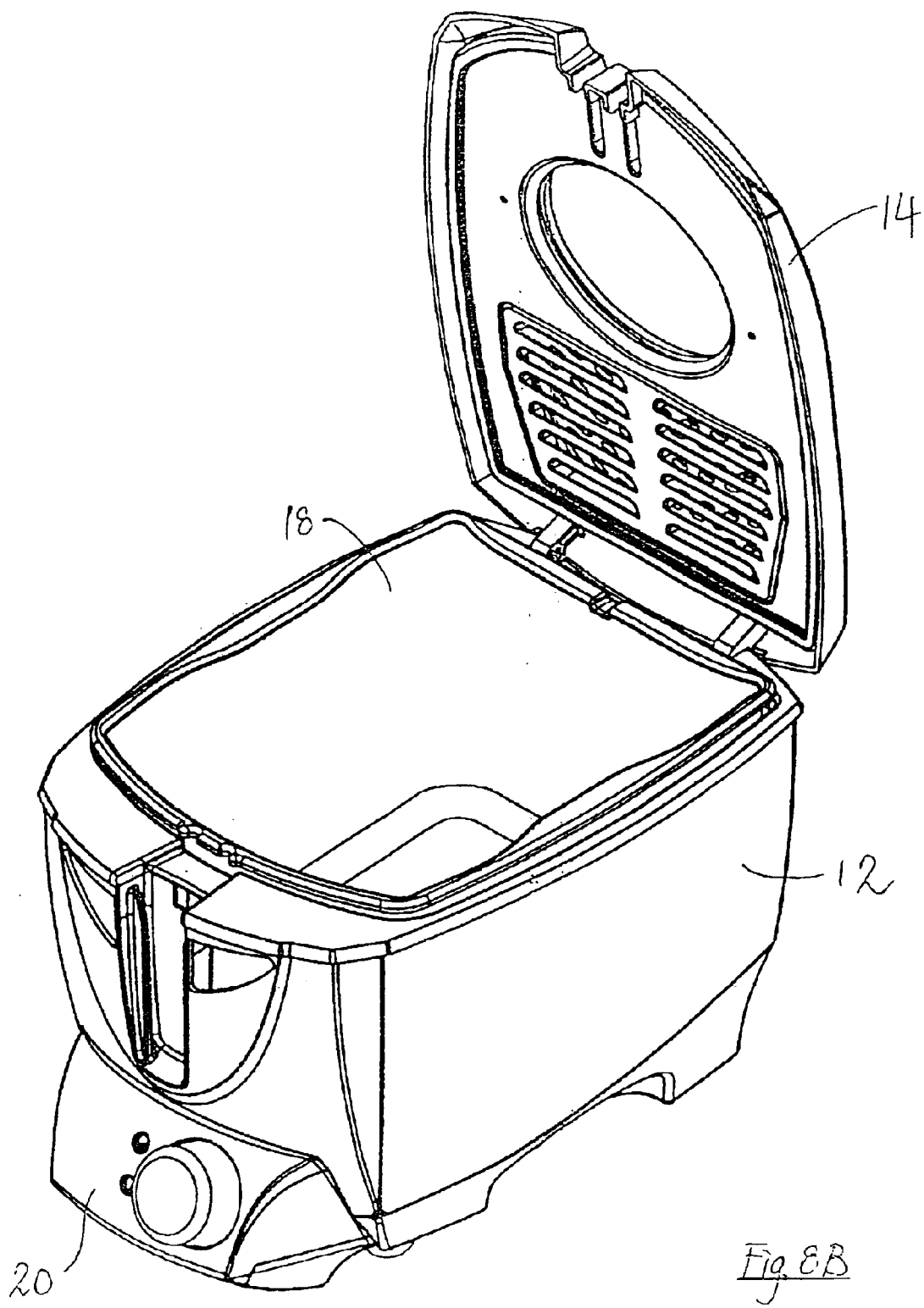
FIG. 8B is a perspective view of the deep fryer shown in FIG. 8A, in an open configuration.
Figure 8C:
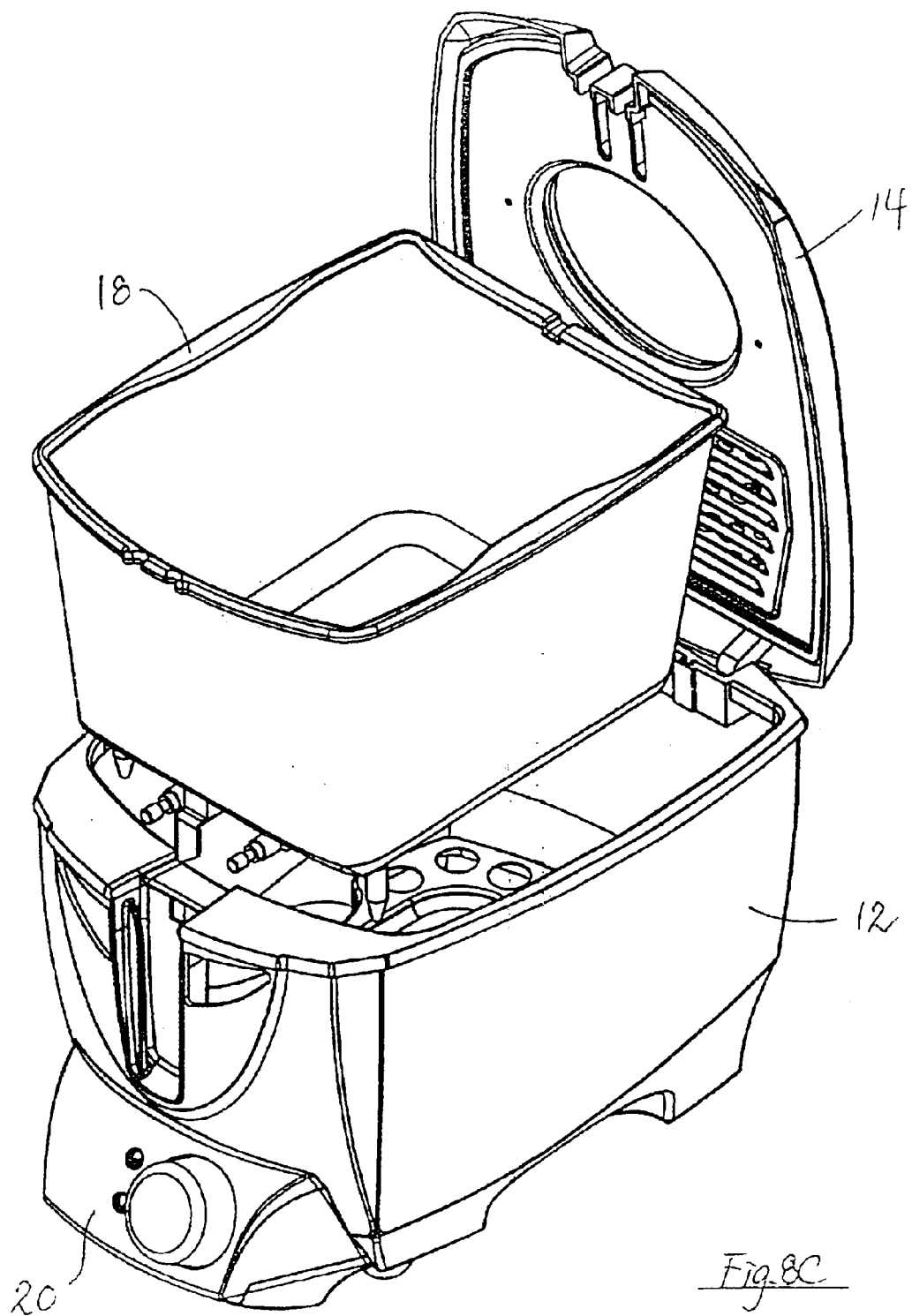
FIG. 8C is a perspective view of the deep fryer shown in FIG. 8A, in which the tank is disengaged from the body.
Figure 8D:
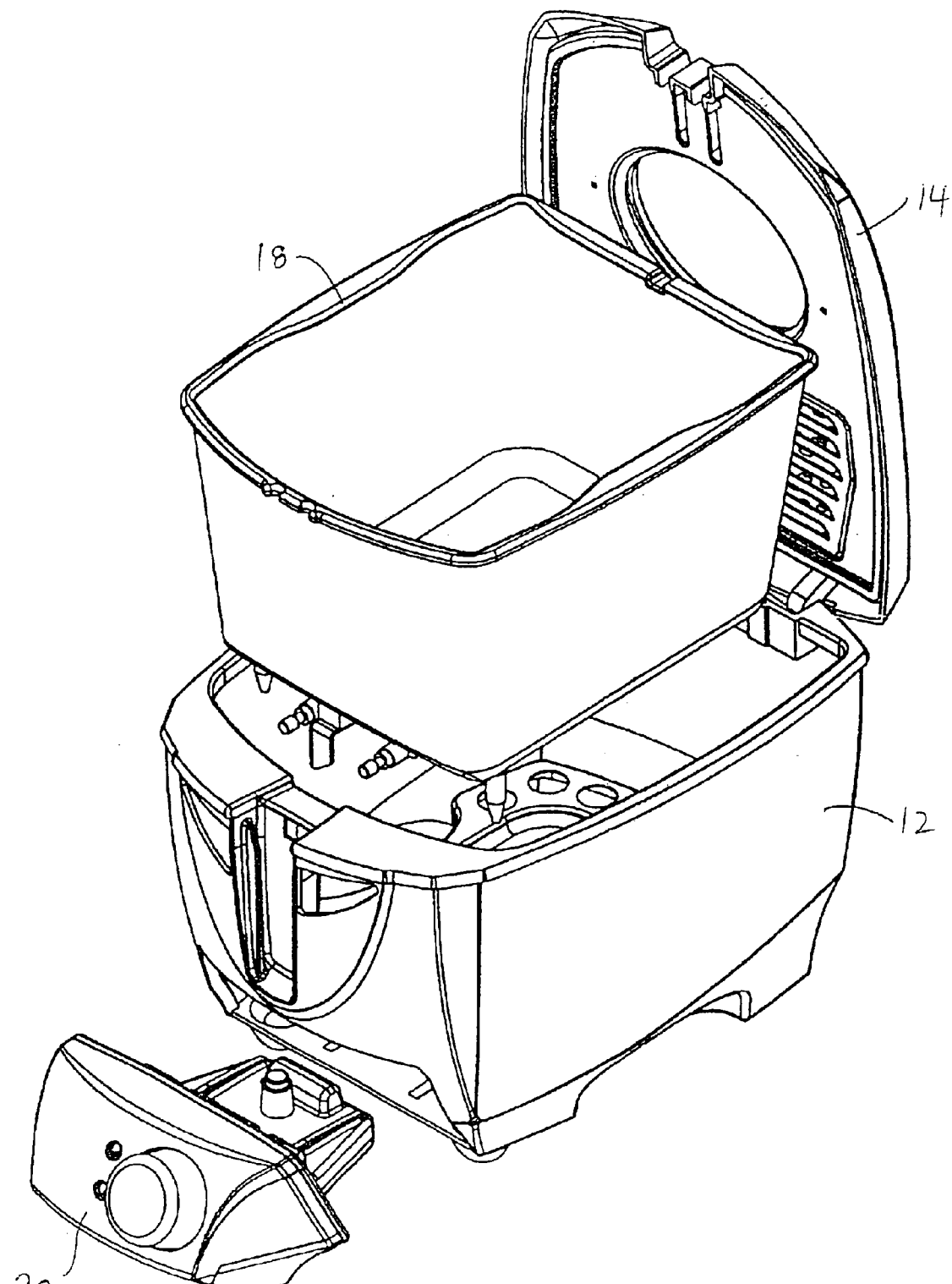
FIG. 8D is a perspective view of the deep fryer shown in FIG. 8A, in which the tank and the control module are disengaged from the body.

FIGS. 8A to 8D show the way in which the deep fryer 10 may be dissembled, e.g. for cleaning. To dissemble the deep fryer 10, the cover 14 is first swivelled open, as shown in FIG. 8B, thus exposing the tank 18 inside. The tank 18 may then be lifted out of the body 12 (see FIG. 8C), thus opening the circuit of the deep fryer 10. Once the tank 18 is disengaged from the body 12, the control module 20 may then be disengaged from the body 12.

It should be understood that the above only illustrates an example whereby the present invention may be carried out, and that various modifications and/or alterations may be made thereto without departing from the spirit of the invention. For example, although a ledge 62 and a vertical hole 48 are here disclosed as the mechanism whereby the tank 18 and the control module 20 are releasably engageable with each other, other complementary engagement mechanisms may also be employed. Similarly, although the ends 60 of the heating coil 56 and the channels 50 of the step portion 46 of the control module 20 are here disclosed as the mechanism whereby electrical connection between the heating coil 56 and the control module 20 is established, other complementary electrical connectors may also be adopted.

It should also be understood that various features of the invention which are here, for brevity, described in the context of a single embodiment, may also be provided separately or in any appropriate sub-combinations.

What is claimed is:

1. An electric cooking apparatus including a body member, a container adapted to contain food to be cooked and a control module operable to control the operation of said apparatus, wherein said body member, said container and said control module are releasably engageable with one another, wherein said container and said control module each includes a respective engagement member which are complementary with and releasably engageable with each other, and wherein said control module is locked against movement from said body member when said body member, said container and said control module are engaged with one another.

2. An apparatus according to claim 1 wherein said control module is disengageable from said body member only when said engagement members are disengaged from each other.

3. An apparatus according to claim 1 wherein said body member is free of electrical or electronic components.

4. An apparatus according to claim 1 wherein said container is mounted with at least one heating element.

5. An apparatus according to claim 1 wherein said control module includes at least one electrical connector adapted to electrically connect with at least one complementary electrical connector of said container to close an electric circuit of said apparatus.

6. An apparatus according to claim 5 wherein said control module includes a pair of electrical connectors adapted to electrically connect with a pair of complementary electrical connectors of said container to close an electric circuit of said apparatus.

7. An apparatus according to claim 5 wherein said at least one electrical connector of said container is carried by a heating element of said container.

8. An apparatus according to claim 7 wherein said at least one electrical connector of said container is provided at an end of said heating element.

9. An apparatus according to claim 6 wherein said pair of electrical connectors of said container are carried by a heating element of said container.

10. An apparatus according to claim 9 wherein said pair of electrical connectors of said container are each provided at a respective end of said heating element.

11. An electric cooking apparatus including a body member, a container adapted to contain food to be cooked and a control module operable to control the operation of said apparatus, wherein said body member, said container and said control module are releasably engageable with one another, wherein said container has a bottom surface for supporting said food to be cooked, and wherein when said apparatus is positioned on a horizontal surface, said bottom surface of said container is inclined relative to said horizontal surface.

12. An electric cooking apparatus according to claim 11 wherein said container includes an upper rim and wherein said bottom surface of said container is inclined relative to a plane containing said upper rim of said container.

13. An electric cooking apparatus according to claim 11 wherein, when said body member, said container and said control module are engaged with one another, said bottom surface of said container slopes upwardly from an end proximate said control module to an opposite end thereof.

* * * * *